United States Patent [19]

Jeffries

[11] Patent Number: 5,012,548

[45] Date of Patent: May 7, 1991

[54] MAGNETIC TAPE CLEANER

[75] Inventor: Stuart W. Jeffries, Santa Clarita, Calif.

[73] Assignee: Data Devices International, Chatsworth, Calif.

[21] Appl. No.: 326,030

[22] Filed: Mar. 20, 1989

[51] Int. Cl.⁵ ............................................. A47L 9/06
[52] U.S. Cl. ..................................... 15/308; 15/309.1
[58] Field of Search ............... 15/306 A, 308, 309, 15/256.5

[56] References Cited

U.S. PATENT DOCUMENTS 3,035,295  7/1956  Buslik et al. .
3,091,794  2/1961  Pillsbury, Jr. .
3,266,196  8/1966  Barcaro ...................... 15/306 A X
3,341,882  9/1967  Morello .
3,475,782  11/1969  Teuber .................................. 15/308
3,683,445  8/1972  Hagadorn ............................ 15/308

Primary Examiner—Chris K. Moore
Attorney, Agent, or Firm—Christie, Parker & Hale

[57] ABSTRACT

In apparatus for cleaning magnetic tape, a rotatable cleaning element has hard, sharp-edged inserts embedded in the circumference of a softer carrier structure. The carrier structure is generally cylindrical in shape and has a central hub which has a plurality of radial ribs, on the end of which the inserts are mounted. The ribs, in part, define air flow passages from a vacuum source to the space between the respective inserts. The carrier structure has a hollow, cylindrical skirt underlying the ribs and a cover overlying the ribs. Baffles lie in the space between the inserts to form slits that bracket each insert.

28 Claims, 3 Drawing Sheets

MAGNETIC TAPE CLEANER

FIELD OF THE INVENTION

The present invention relates generally to the cleaning of magnetic media and more particularly, to the honing of magnetic tape to remove dirt and loose oxide.

BACKGROUND OF THE INVENTION

Magnetic tape is now utilized for storage of digital and analog information in applications ranging from computers to video recordings. In normal use, magnetic tape picks up airborne dirt particles and oxide flakes from its surface. The presence of these contaminants on the tape causes errors in the writing of information to and reading information from the tape. The contaminated areas move the tape away from the read and write heads resulting in a failure to record or playback the intended information.

This problem with accumulation of dirt and oxide has been well recognized in the art. Fixed and rotating single blade devices have been used to hone contaminants from the surface of magnetic tape. A significant problem with single blade devices is heavy blade wear due to the hardness of the oxide coatings on the tape.

A device with multiple honing surfaces has also been used to clean magnetic tape. The use of multiple surfaces reduces the wear problem of single honing surface devices. A rotating cylindrical tube is utilized with a plurality of slots spaced about its circumference. A vacuum line connected to an aperture provided at the base of the tube serves to withdraw the particles cleaned from the tape. A problem with this method is the high expense and complication of fabricating a hollow slotted cylindrical tube of a material sufficiently hard to withstand the abrasion of the oxide coatings on the tape. Another problem with the tube design is that it heats up due to inadequate cooling airflow. The shape of the slot performs the dual functions of defining the honing surface and providing an air conduit for the removal of particles cleaned from the tape. This does not provide an effective means of controlling the flow of air past the tape or through the slot for needed cooling and self cleaning of the honing surface. As a result, the high temperatures generated by friction cause the loose oxide and dirt removed from the tape to become welded to the honing surfaces. This mandates frequent cleaning of the slotted tube design.

SUMMARY OF THE INVENTION

The present invention utilizes a cylindrical carrier of a softer, molded material in which hard inserts are set for the honing surfaces. The carrier with inserts is less expensive and more easily fabricated than the slotted tube design. The inserts, acting as honing blades, are set in the circumference of the carrier alternating with baffled airflow openings. The airflow openings extend into the interior of the carrier where they communicate with a vacuum source. During the cleaning operation the pressure differential created by the vacuum source forces the tape against the blades. Leakage of air past the tape flows over the blades, cooling them. The air then travels into the carrier's airflow openings effectively withdrawing the contaminants removed from the tape. The airflow openings and the baffles within the openings are placed and shaped to optimize this airflow. As a consequence, there is less dirt and oxide buildup on the blades and a reduced need for cleaning.

The improved airflow additionally provides a more effective low pressure area between the tape and the carrier. This insures a better contact between the tape and the blades permitting the use of higher tape transport speeds. Consequently, cleaning to be accomplished at more quickly than with the prior art.

In a preferred embodiment the tape cleaner comprises a transport mechanism which moves the tape from reel to reel past, and tangentially in contact with, the rotating cylindrical cleaning element. The cleaning element comprises a carrier structure with a multiciplicity of alternating blades and airflow openings distributed circumferentially around the carrier structure. The blades and airflow openings are of a length wider than the tape to insure the entire recording surface of the tape is brought in contact with the blades. The cleaning element is rotated at a speed so that the tape passing over the cleaning element slips relative to the element. This causes the blades to hone the entire oxide surface of the tape as it passes by the element. The airflow openings are recessed and have baffles which direct the airflow. A vacuum line is connected to an opening below the cleaning element providing a pressure differential between the atmosphere and the airflow openings. The pressure differential forces the tape against the rotating blades insuring good contact therewith. The pressure differential also creates airflow past the blades to cool them and carries the dirt and oxide particles honed from the tape away from the cleaning element.

A feature of the invention is that the cleaning element may be comprised of a softer molded carrier structure with the blades being one or more hard sharp-edged inserts embedded in the circumference of the carrier structure.

DETAILED DESCRIPTION

Figure 1:
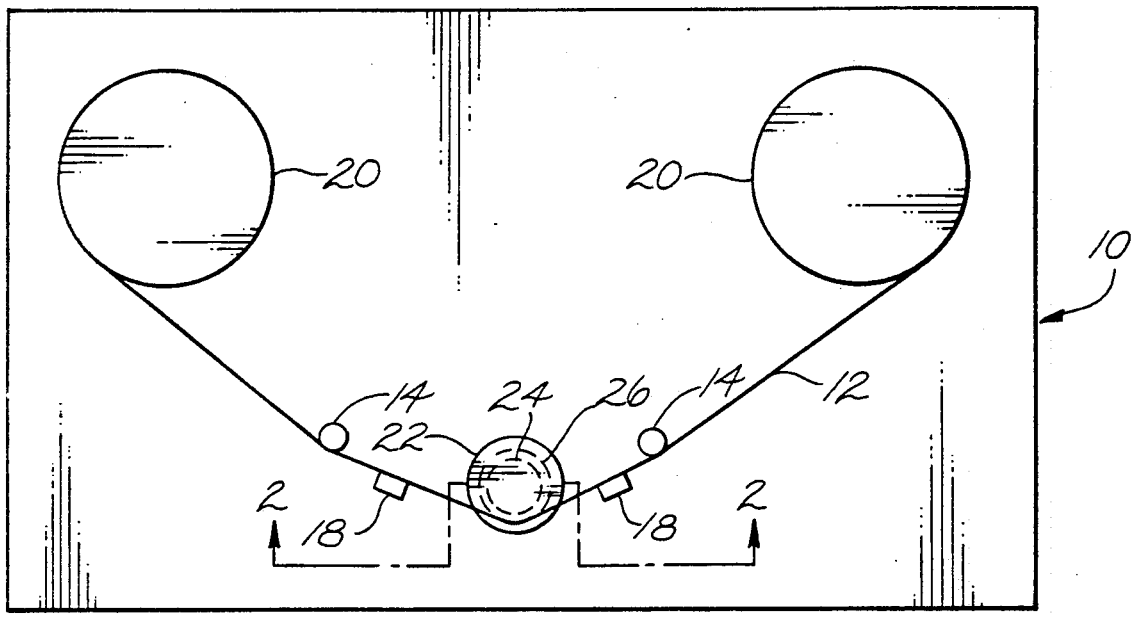
FIG. 1 is a top plan view of an embodiment of the cleaning element and transport of this invention.

Referring to FIG. 1, the apparatus has a tape transport mechanism with a cover plate 10. Supply and takeup reels 20 are rotatably mounted on the cover plate. The reels 20 are reversible so that tape 12 may be moved bi-directionally past a cleaning element 24. The cleaning element 24 is medially disposed between the reels 20 and surrounded by a housing 22.

Figure 2:
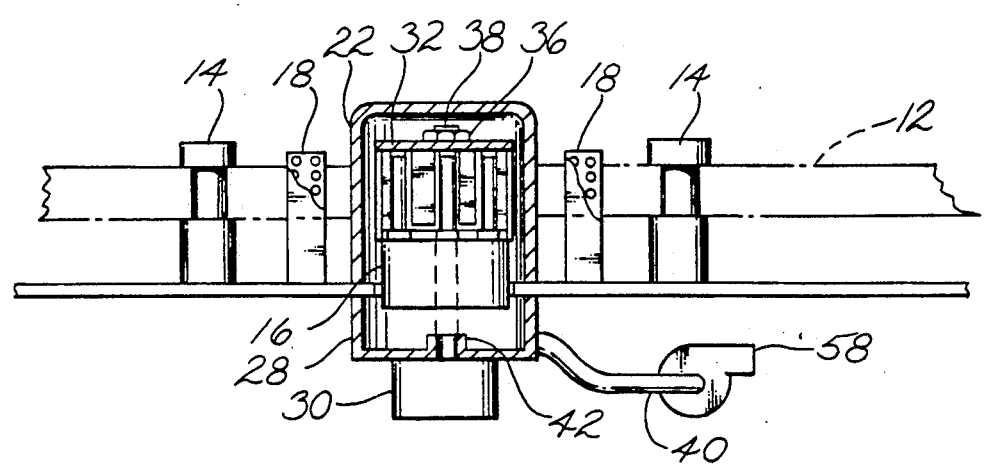
FIG. 2 is a front elevation view taken along line 2—2 of FIG. 1.

A circular aperture 26 is cut through the top cover plate 10 adjacent to the base of cleaning element 24. Referring now to FIG. 2, a skirt 16 of the cleaning element extends through the aperture 26. The aperture is in communication with a plenum 28 mounted on cover plate 10 opposite to housing 22. The plenum 28 is in communication with a vacuum source 58 through conduit 40. Cleaning element 24 communicates with the vacuum source 58 creating a pressure differential between the atmosphere and the cleaning element 24. This pressure differential forces the tape against cleaning element 24 and creates an airflow which removes dirt and oxide particles cleaned from the tape 12.

Auxiliary vacuum cleaners 18 comprise hollow tubes with small openings on one surface are additionally connected to the vacuum source 58. Vacuum cleaners 18 are medially disposed between the cleaning element and the idle rollers. The openings on the cleaners 18 remove loose dirt and oxide particles from the base side of the tape as it passes by in contact with the cleaners, both before and after the tape's contact with the cleaning element 24.

Figure 3:
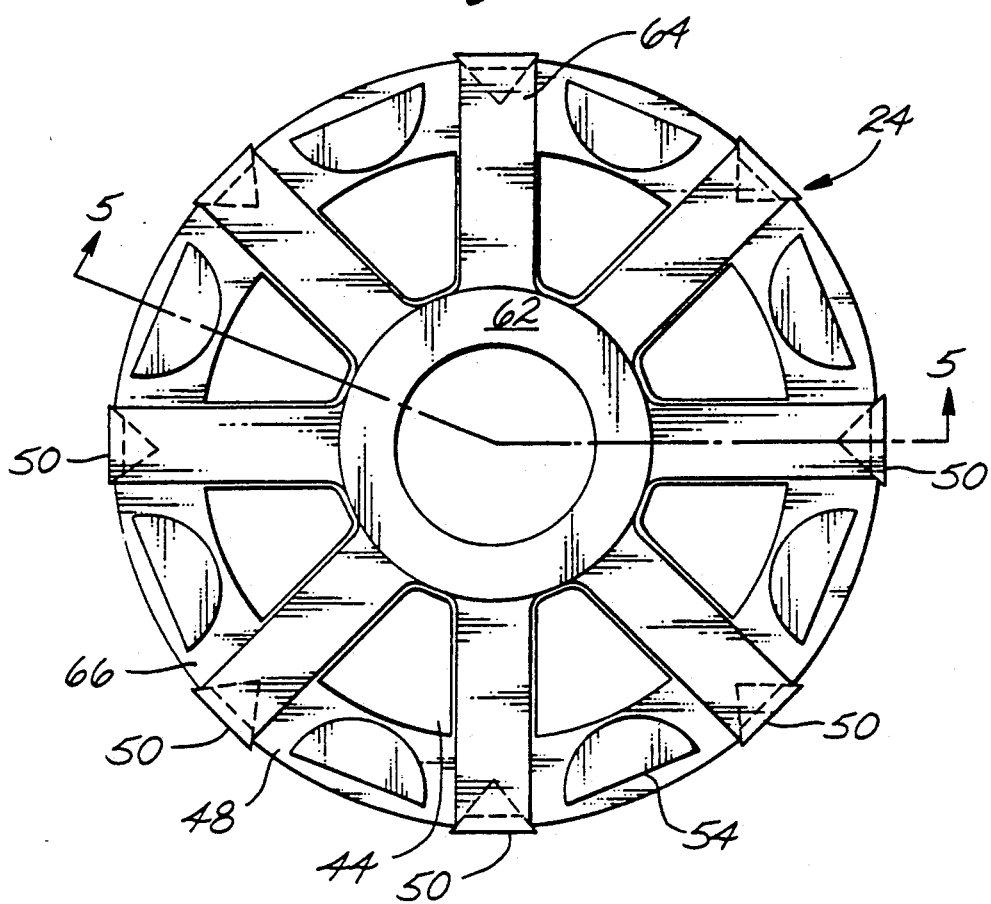
FIG. 3 is a top plan view of the cleaning element of this invention.
Figure 4:
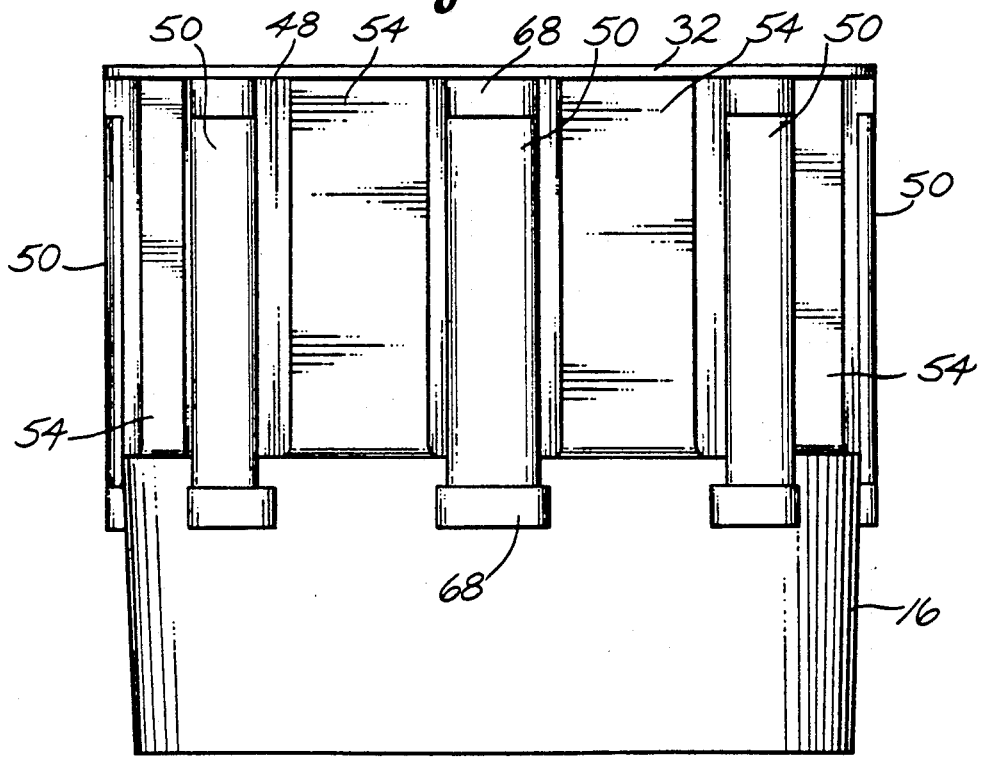
FIG. 4 is a side elevation view of FIG. 3.
Figure 5:
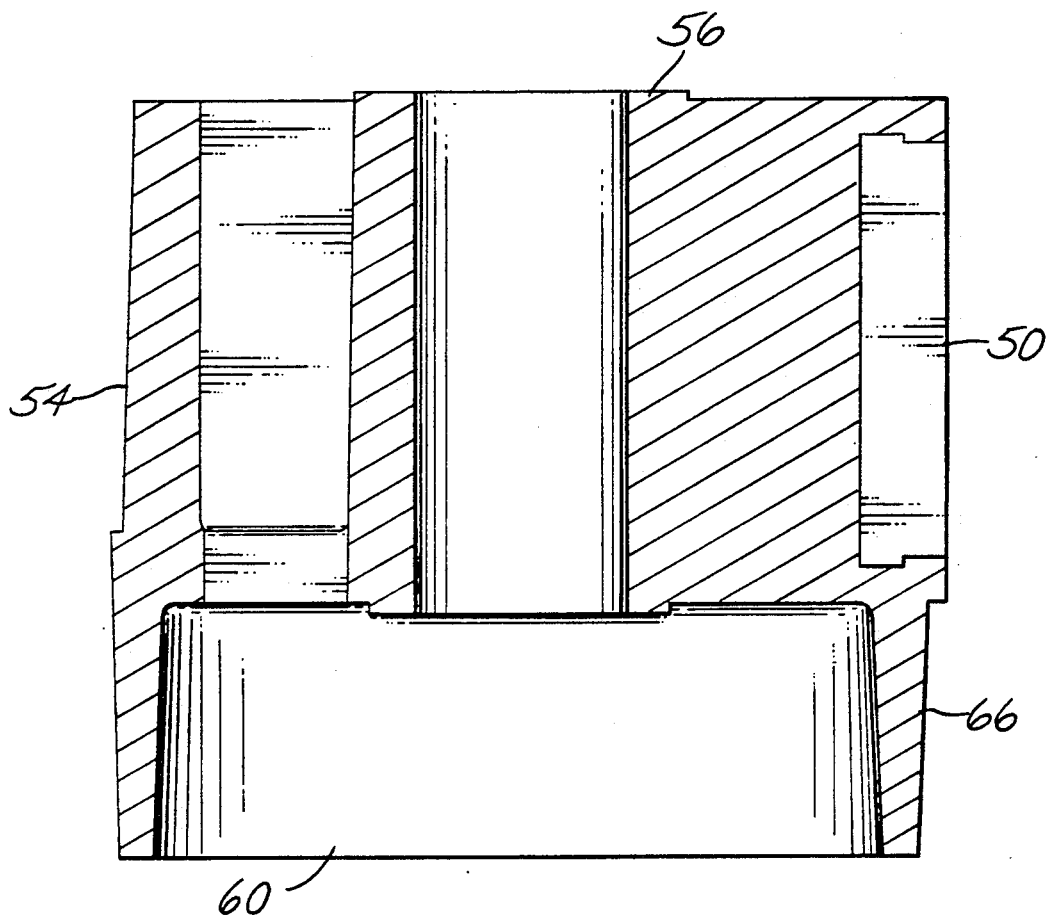
FIG. 5 is a section view taken along line 5—5 of FIG. 3.

Turning now to FIGS. 3, 4 and 5, there is seen cleaning element 24 of this invention, which is a cylindrical carrier 56 containing a plurality of honing blades 50, airflow openings 48 and baffles 54. The blades 50 perform the primary cleaning action with regard to the tape 12. Cleaning element 24 rotates presenting a plurality of cleaning or honing surfaces to the tape as the tape moves past the element. Since the tape passes tangentially to the loci of points defined by the rotating blades, the surface of the blades will be worn down evenly, and are thus self sharpening. The number of blades is not critical so long as there is a sufficient number to achieve an even and smooth transport of the tape past the cleaning element.

Figure 6:
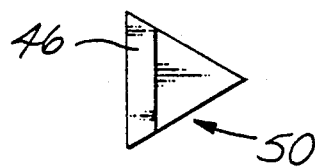
FIG. 6 is a top plan view of element 50 shown in FIG. 5.

The blades 50 are fabricated of a hard non-magnetic material such as tungsten carbide or material of similar or greater hardness. The material is sintered, cast or otherwise fabricated, polished, and mounted in the carrier 56. The length of the blades are sufficient so that they will more than cover the width of the magnetic tape to be cleaned. As shown in FIGS. 5 and 6, the preferred longitudinal cross-section of the blades is triangular with a step at each end to provide interlocking surfaces with the carrier.

The carrier 56 is fabricated of a moldable softer and less expensive material than that used for the blades. Material such as thermoset polycarbonite plastic or other suitable injection moldable thermoset plastic may be used for the carrier 56. The carrier is preferably molded with the blades in place. After molding, the carrier and blades are machined to their final configuration.

In the presently preferred embodiment, the carrier 56 is made up of a one piece molded construction generally cylindrically in shape comprising a skirt 66 which defines a cavity 60, above which a center hub 62 extends. A multiplicity of radial ribs 64 extend between the hub 62 and the skirt 66. A blade 50 is imbedded into the end of each rib 64. A portion 68 of the rib 64 extends beyond the imbedded blade 50 to insure its retention within the rib.

The ribs 64 define the airflow openings 48 of the carrier 56. The airflow openings 48 are in communication with the cavity 60. Within each airflow opening 48, attached to the top of the skirt 66 and axially recessed from its outer circumference, a baffle 54 extends upwardly parallel to the axis of the hub 62. The center hub 62, the ribs 64 and the baffles 54 are all of the same height, which is greater than the width of the tape to be cleaned. Baffles 54 are of a shape to efficiently create a pressure differential between the blades 50 and the tape 12 insuring good contact therebetween, direct air past the blades 50 cooling them and creating the airflow necessary to remove contaminants cleaned from the tape. The baffles 54 are semicircular in cross-section with their flat side facing away from the hub 62.

Returning now to FIG. 2, the cleaning element 24 is mounted on an axle 38 passing through hub 62. At the top of the cleaning element, a lock nut 36 engages the exposed portion of the axle 38 and maintains tight engagement between the axle, a cover 32 and the top surface of the cleaning element. The cover 32 functions as an air seal for the top portion of the cleaning element 24. Axle 38 is tightly-fitted in the hub 62 so that rotation of the axle causes rotation of the cleaning element. Axle 38 decreases in diameter as it extends through a sleeve bearing 42 attached to the lower side of the plenum 28. The change in diameter of the axle maintains the position of the axle relative to the bearing 42. The axle terminates in a motor assembly 30. The sleeve bearing 42 and the motor assembly 30 serve to hold the axle in a rotatable position perpendicular to the top cover plate 10.

The cleaning element is driven by the motor assembly 30 in the same or opposite direction as the movement of the tape past the element, at a slightly faster or slower rate than the movement of the tape. For example, the speed of rotation of the cleaning element may be approximately 300 r.p.m. with a differential speed of the tape being about 10% faster or slower than the rotational speed of the cleaning blades 50 on the cleaning element.

The foregoing discloses and describes a preferred embodiment of the present invention. One skilled in the art will readily recognize from such discussion that various changes, modifications and variations may made therein without departing from the spirit and scope of the invention as defined in the following claims.

What is claimed is:

1. An apparatus for cleaning magnetic tape comprising:
   (a) means for transporting tape from reel to reel;
   (b) a rotatable cleaning element having a plurality of hard sharp-edged inserts for cleaning scraping tape, said inserts being embedded in the circumference of a softer carrier structure;
   (c) means for directing tape past the cleaning element in contact with the inserts; and
   (d) means for rotating the cleaning element at a rotational speed so that the tape passing over the inserts slips relative to the element.

2. The tape cleaning apparatus of claim 1 additionally comprising:
   (a) one or more airflow openings in the circumference of the carrier structure; and
   (b) means for producing a pressure differential through the airflow openings past the tape for withdrawing air across the sharp-edged inserts to carry particles cleaned from the tape away from the cleaning element.

3. The apparatus of claim 1, in which the inserts comprises a plurality of axially elongated inserts distributed around the circumference of the carrier structure in spaced apart relationship.

4. The apparatus of claim 3, additionally comprising a vacuum source and a plurality of airflow passages formed in the carrier structure from the spaces between the respective inserts and the vacuum source.

5. The apparatus of claim 4, in which the carrier structure is generally cylindrical in shape, the carrier structure having a central hub from which a plurality of radial ribs equal in number to the inserts extend, the ends of the ribs forming at least part of the circumference of the carrier structure.

6. The apparatus of claim 5, in which the inserts are mounted on the ends of the ribs.

7. The apparatus of claim 4, in which the airflow passages are in part defined by the ribs.

8. The apparatus of claim 7, in which the carrier structure additionally has a hollow cylindrical skirt underlying the ribs and a cover overlying the ribs which in part also define the airflow passages.

9. The apparatus of claim 8, additionally comprising a cover plate on which the tape transporting and directing means are mounted, an aperture in the cover plate, a vacuum plenum under the cover plate in communication with the aperture, means for connecting the vacuum source to the plenum, and means for positioning the carrier structure so the ribs lie above the cover plate and the skirt extends through the aperture to the plenum.

10. The apparatus of claim 9, in which the rotating means comprises a motor having a drive shaft and means for coupling the drive shaft to the hub.

11. The apparatus of claim 10, in which the motor is mounted under the plenum and the drive shaft extends through the plenum to the hub.

12. The apparatus of claim 11, in which the hub has a center passage into which the drive shaft tightly fits.

13. The apparatus of claim 12, in which the carrier structure has axial baffles between the ribs to form axial inlet slits to the airflow passages bracketing each insert.

14. The apparatus of claim 13, in which the baffles are semi-cylindrical and have a flat face forming part of the circumference of the carrier structure.

15. The apparatus of claim 14, in which the inserts protrude more than the baffles.

16. The apparatus of claim 15, in which the carrier structure, including the ribs, hub, skirt, and baffles, has a one piece molded plastic construction and the cover is a separate piece.

17. The apparatus of claim 5, in which the inserts are embedded in the ends of the ribs.

18. A generally cylindrical tape cleaning element comprising:
a central hub;
a plurality of ribs extending radially from the hub;
axial tape cleaning blades located on the ends of the respective ribs; and
a plurality of baffles between the ribs forming axial slits that bracket each blade.

19. The tape cleaning element of claim 18, in which the hub has a center passage.

20. The tape cleaning element of claim 19, additionally comprising a skirt underlying the ribs and the baffles, the skirt forming a cavity in communication with thee space between the ribs.

21. The tape cleaning element of claim 20, in which the baffles are semi-cylindrical and have a flat face forming part of the circumference of the element.

22. The apparatus of claim 21, in which the blades protrude more than the baffles.

23. The apparatus of claim 22, in which the element has a one piece construction comprising a molded, relatively soft plastic carrier, including the hub, the ribs, the skirt, and the baffles, and relatively hard wear resistant inserts, including the blades.

24. The apparatus of claim 23, in which the end of the skirt and the end of the ribs are open.

25. The apparatus of claim 24, in which the inserts are stepped down at their ends to form interlocking surfaces with the carrier.

26. The apparatus of claim 25, in which the inserts are made of non-magnetic material.

27. An apparatus for cleaning magnetic tape comprising:
means for transporting tape from reel to reel;
a rotatable, generally cylindrical cleaning element having a plurality of sharp-edged slots parallel to the axis of rotation;
means for directing tape past the cleaning element in contact with the sharp-edged slots;
means for rotatably driving the cleaning element such that the tape slips relative to the cleaning element;
a cover plate underlying the transporting means and directing means;
a vacuum source lying under the cover plate; and
airflow passage means formed through the interior of the cleaning element from the slots to the vacuum source to remove contaminants from the tape passing the cleaning element.

28. The apparatus of claim 27, in which an aperture is formed in the cover plate, the cleaning element additionally has a hollow cylindrical skirt extending through the aperture to the underside of the cover plate which in part also defines the airflow passage means, the apparatus additionally comprising a vacuum plenum under the cover plate in communication with the aperture and means for connecting the vacuum source to the plenum.

* * * * *